(12) United States Patent
Katz

(10) Patent No.: US 8,393,904 B2
(45) Date of Patent: Mar. 12, 2013

(54) TIME OUT SYSTEM AND PROCESS

(76) Inventor: Venu Katz, Los Angeles, CA (US)

( * ) Notice: Subject to any disclaimer, the term of this patent is extended or adjusted under 35 U.S.C. 154(b) by 1130 days.

(21) Appl. No.: 11/502,073

(22) Filed: Aug. 10, 2006

(65) Prior Publication Data

US 2008/0050703 A1 Feb. 28, 2008

(51) Int. Cl.
*G09B 19/00* (2006.01)
(52) U.S. Cl. ........................................................ 434/236
(58) Field of Classification Search .................. 434/350, 434/322, 323, 236–238; 600/300
See application file for complete search history.

(56) References Cited

U.S. PATENT DOCUMENTS

| | | | | |
|---|---|---|---|---|
| 4,683,891 A | * | 8/1987 | Cornellier et al. | ............ 600/301 |
| 5,304,112 A | * | 4/1994 | Mrklas et al. | ................... 600/27 |
| 5,813,863 A | * | 9/1998 | Sloane et al. | ................. 434/236 |
| 7,699,614 B2 | * | 4/2010 | Thurman | ....................... 434/237 |
| 2005/0074731 A1 | * | 4/2005 | Brazil | ............................ 434/236 |
| 2005/0154264 A1 | * | 7/2005 | Lecompte et al. | ............ 600/300 |

* cited by examiner

*Primary Examiner* — Xuan Thai
*Assistant Examiner* — Peter Egloff

(57) ABSTRACT

TIME OUT is a participant assisted system and process that can help participants learn to modify their inappropriate behavior in the classroom and/or in life. The educational, interactive computer program can guide the participant with pre-recorded or interactive verbal directions, videos and exercises in experiential learning. The system and process can have a Bio-feedback Check that measures the participant's level of stress at the beginning of the process and after the process has been completed that can measure the physiological change created by participating in the process. The particular exercise can be automatically chosen for them for the specific inappropriate behavior, specific age group and experience with the TIME OUT system and process. Each TIME OUT can be automatically saved in their TIME OUT Tool Kit. The system and process also can include off-site electronic or manual coaches that the participant accesses through the system. Some of the older and more advanced participants may be automatically offered access to mentors and apprenticeships.

9 Claims, 9 Drawing Sheets

TIME OUT

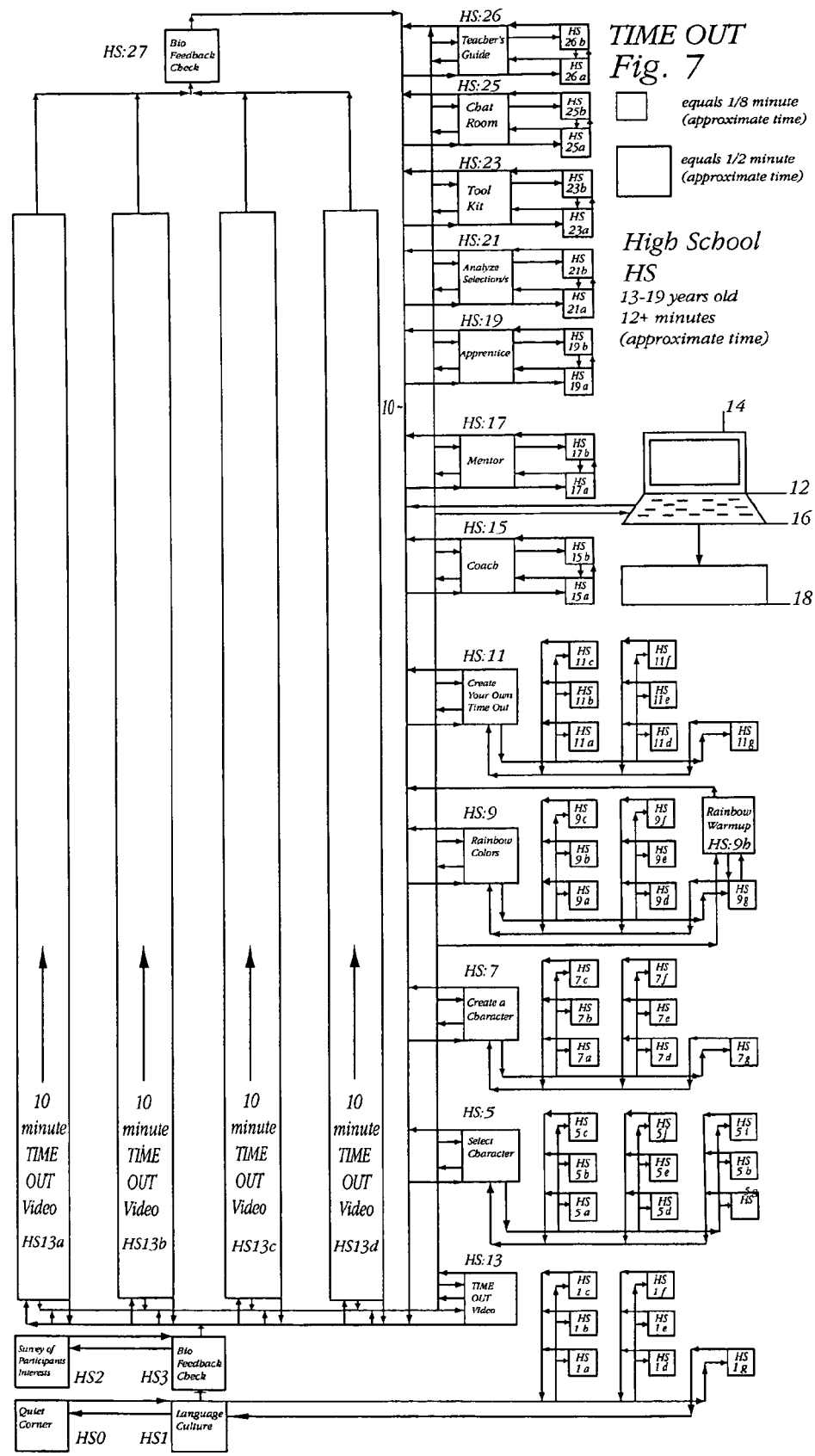

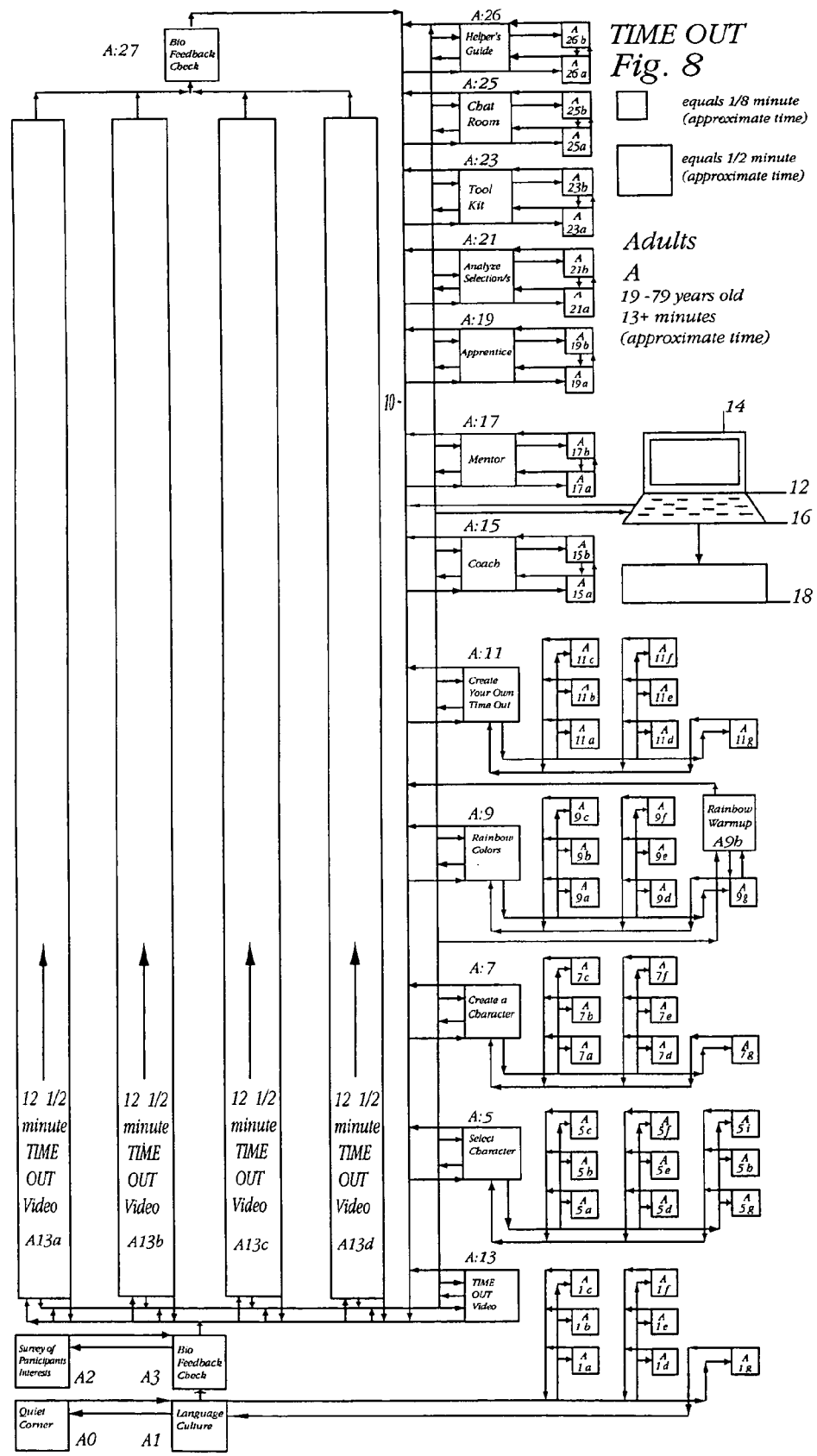

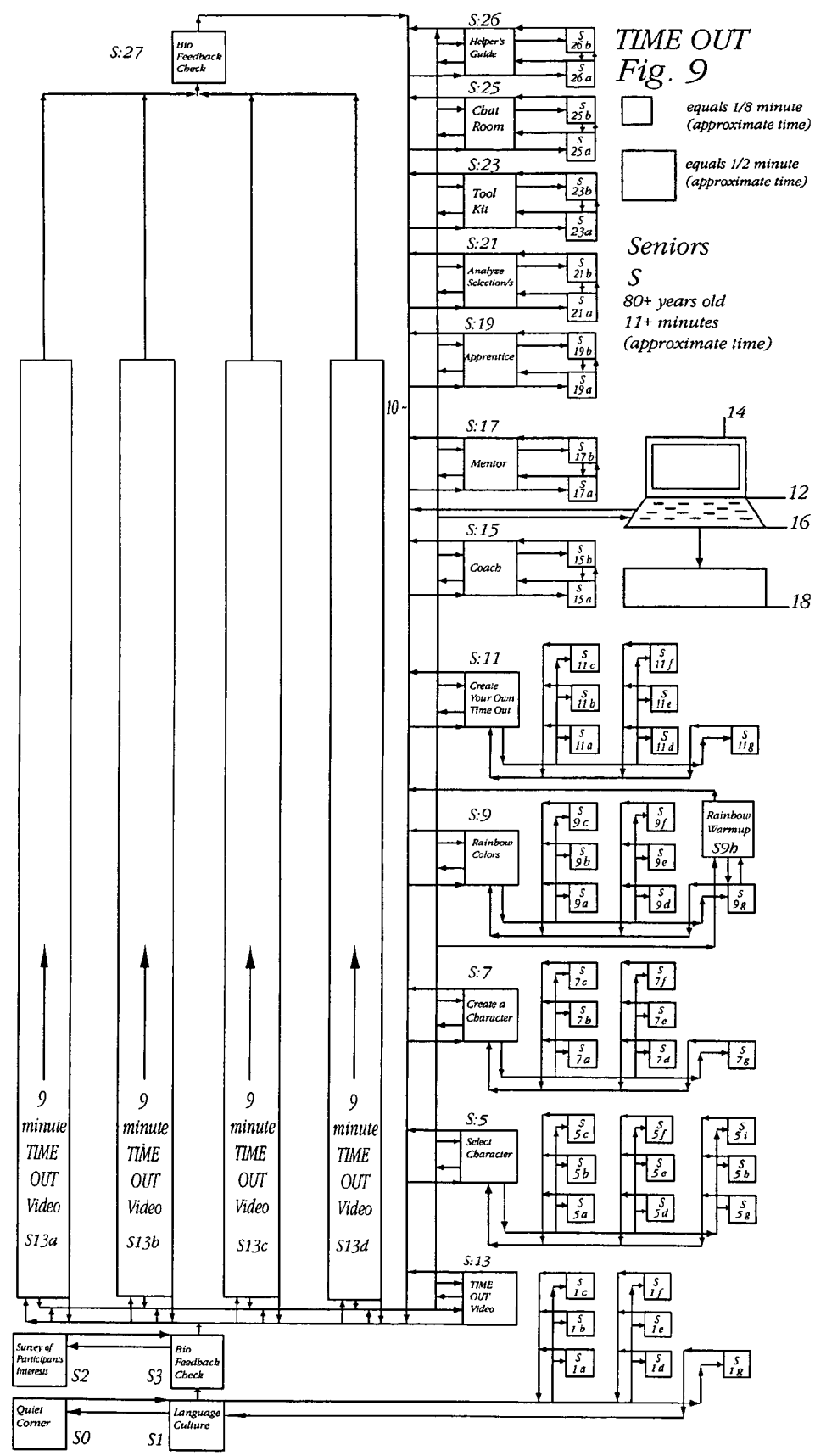

TIME OUT SYSTEM AND PROCESS

BACKGROUND OF THE INVENTION

This invention relates to an educational system and process and more particularly, to a system and process that can modify disruptive behavior and improve learning skills.

The results of Yale University's Foundation for Child Development study that were released March 2005 revealed that: "Prekindergarten students are expelled at a rate more than three times that of their older peers in the K-12 grades."

It has been reported that 45% of the students who attend both traditional and non-traditional schools in the Los Angeles Unified School District including vocational schools, continuation schools and independent study programs that provide some personal instruction, do not graduate.

The results of the Public Agenda Poll published in the Los Angeles Times. Sep. 19, 2003, determined disruptive classroom behavior is the greatest impediment to a learning environment in schools.

If a teacher asserts a child is performing so their behavior is out of context from their environment, sometimes the student has to be removed from the classroom because they cannot behave appropriately, and are disruptive to both themselves and other students.

School staff or teachers often take children out for few minutes or a certain period of time, hoping the student will "calm down". Children will often misinterpret this action by their teacher and or caregiver as "punishment." and then they often can't reorganize themselves to the education of the classroom for the rest of their lives. This can become a detriment to their future. When they misinterpret this information, regarding what they see as punishment, early in school, they can experience difficulty later which often results in low self-esteem that can often result in substandard performance in school, and the child can become stuck with unresolved educational and emotional issues.

At ages 12 to 14, it can show up in an even more dramatic ways and can become episodic. The student can lose interest in the learning process. This is self-detrimental and can also be detrimental to the classroom, school, the student's family, and the community. The underpinning of emotional context can aggravate learning disabilities and can set the student on a path of potential doom. The existing educational model has generally not resolved this. The model can keep them from measuring up to this.

Parents often didn't teach a sense of self. Neither the current educational system, nor the child, usually knows how to do it. The child exhibiting inappropriate behavior is often not achieving because of past patterns that exist from early childhood. This child usually does not know how to work through consequences of behavior.

In today's school system students are often given numerous ineffective "time outs," as they are colloquially called, before expulsion.

It is therefore desirable to provide an improved process and system that can overcome most of the above situations.

BRIEF SUMMARY OF THE INVENTION

TIME OUT is a user friendly educational system and process that can provide an educational interactive, hands-on computer program that can guide the participant with videos, pre-recorded audio directions, and/or exercises in experiential learning.

TIME OUT can include a series of computerized learning programs that are developed for particular age groups and behavioral situations. TIME OUTS can take these now blank periods of time or "time outs" and can turn them from periods of "punishment" into "educational islands of relaxation" and/or an ongoing experiential learning process of experimentation, reflection and self-improvement.

TIME OUTS can teach the child skills that can help them reorganize their energy so that they can be able to reenter the group situation.

TIME OUTS can include music, voices, and recordings native to the student's county and/or of respected leaders from the student's country or culture to help teach them the skills they need to reorganize and manage their behavior and integrate with the group.

TIME OUT can offer a model that should have been the pre-model before preschool. Because many students missed this, they may never learn to organize their behavior in a necessary way. TIME OUT can help children and adults get past this behavioral step and get into learning with changes that can be measured.

TIME OUT can involve the importance of behavioral modification in learning to manage the participant's own energy and in a student's ability to learn.

TIME OUTS can turn what was punishment into a most effective, learning tool that children actually benefit from using. This can make the classroom a better learning environment for everyone in the class.

Ideally a child starts using the TIME OUT program in preschool and takes their TIME OUT Tool Kit, filled with their TIME OUT "Tools for Life," to a grade school, that is enrolled in the TIME OUT program, and on to a middle school and a high school that are also enrolled in the TIME OUT program.

By the time this student graduates from high school the TIME OUT Tools for Life program and their TIME OUT Toolbox can be companions for life.

All teachers, facilitators, aids, staff, coaches, and students in the participating school can be required to personally experience many TIME OUTS each school year, because at one time or another everyone can use a TIME OUT.

There can be many at risk students or participants, who may benefit from this novel TIME OUT system and process, including: gifted students who need to be mentally challenged, students with learning disabilities, emotional disorders, anxiety disorder, behavior disorder, attention deficit disorder (ADD), attention deficit hyperactivity disorder (ADHD). cognitive impairments, retardation, traumatic brain injury (TBI), cross-categorical disabilities, autism spectrum (autistic behavior), Asperger's disorder, Down Syndrome, Tourette Syndrome, conduct disorder, adults or children with obsessive-compulsive disorder (OCD), psychiatric disorder, bipolar disorder, sensor impairment (deaf or blind), speech disorders (e.g. speech delay, stuttering, lisping), auditory processing disorder, oppositional defiant disorder, post-traumatic stress disorder, depressive disorder (depression), dysthymia, schizophrenia, premenstrual dysphoric disorder, seasonal affective disorder (SAD), physical handicaps, Alzheimer's disease, dementia, etc.

At risk students may indicate a need for additional TIME OUTS for extra guidance and coaching. This can be compared to sports teams and certain players that often require extra direction and encouragement from their coaches.

It is both helpful and very important for at risk students to see all of their teachers and peers participate in, and benefit from the program. This can takes it out of the concept of being only for challenged students that are at risk, and repositions it as the helpful healing and learning tool for everyone, that it can actually be.

When at risk students are able to see both teachers and good students participating right along with them and profiting from the program, it can do wonders for their success rate and everyone's self esteem.

This can open the door to a journey of experiential learning that can hel individuals realize their full potential.

The TIME OUT system, method, and products can help one modify their behavior, improve one's ability to learn and also improve the quality of one's life.

The TIME OUT system and method can address behavior issues and can include a series of early childhood to grave, computerized, audio video, educational, electronic and experiential learning programs that are developed for specific situations, age groups, cultures, and different ways of learning.

TIME OUT is an educational, interactive, hands-on, behavioral modification system. The participant can be guided by pre-recorded verbal directions, to first select the language of their choice to guide the student through the particular exercise in experiential learning that can be automatically chosen for their specific inappropriate behavior and a particular age group.

The participants can complete a "Survey of Participants Interests" at the beginning of each school year, or upon introduction to the TIME OUT program and/or on a yearly basis after that.

Then a process can be provided to automatically measure the current level of each participant's stress with a "Biofeedback Check." They are then guided to "Select the Character" they prefer to guide them through the TIME OUT. Then all but "PS" Preschool participants may choose from a selection of "Rainbow Colors" to color their characters and backgrounds.

The TIME OUT system and process can offer different options and levels of involvement for each of the nine different systems and processes. The nine different systems and processes represent nine different age and grade groups. The nine, age and grade groups represent preschool through senior citizens.

The TIME OUT options offered, which a participant can select or be directed to do, depend upon the participant's age, interests, level of involvement with the TIME OUT program, and the current state of one's behavior. The options can include; the option to begin their TIME OUT in the "Quiet Corner," the option to "Create a Character" themselves, the option to "Create Your Own TIME OUT" from a selection of backgrounds, color schemes, narrators, music, and characters, the option to create one's own discipline from choices or the option to participate in a "Rainbow Warm Up."

Some participants may be awarded special access to a "Mentor" or an "Apprenticeship" to help them participate in the development of actual TIME OUTS that can become part of the TIME OUT system and process. If their contributions are used they can receive recognition and rewards.

All TIME OUT participants can receive recognition and rewards.

The TIME OUT system and process can include an "Analyze Selections" section for each TIME OUT the participant participates in. The participant, caregiver, and/or teacher can also have the option to analyze a group or all of the selected TIME OUTS the participant has completed in a specific time period.

When the participant completes a TIME OUT, the participant can be directed to measure the level of their stress with the second "Biofeedback Check" that can measure the participant's level of stress. One can use the Biofeedback Check both at the beginning of the process and after the process has been completed. This can measure the physiological change that can be created by participating in the process. This can allow the participant to personally experience, and then see how effective this particular TIME OUT is for them at this particular time.

The TIME OUT system and process can include a "Teacher's Guide" also called a "Helper's Guide" depending upon the age group of the student and/or can include a "Parent's Guide". The participant, caregiver, and/or teacher can have the option to access educational, written information, and printable materials as well as audio, video, email and phone guidance.

Excerpts, forms and questionnaires can be included such as, but not limited to, "The ADHD Solution Workbook," by Tom Daly, from pages three through forty-five, © Smarty Pants Publications.

The TIME OUT system and process can include access to electronic or off-site "Coaches" that can help them with the process and can check up on them after a TIME OUT and/or have an ongoing online and/or phone relationship if necessary.

All of the TIME OUTS that one completes can be automatically "saved" in each participant's personal "TIME OUT Tool Kit."

The TIME OUT system and process can also include monitored TIME OUT "Chat Rooms" for particular age groups. Here participants, teachers, parents, and caregivers can discuss their experiences with TIME OUT with other TIME OUT participants, and "Coaches", if necessary or desirable, and get questions answered. Participants, teachers, parents, and/or caregivers can be encouraged to share their suggestions on how to improve the program.

The above TIME OUT process and system can also be enhanced with other behavioral modification options and additional language, age, grade systems and processes.

Aspects of the TIME OUT system and process can be accomplished through interconnected wired or wireless connections.

TIME OUT Basic Philosophy is as follows: We do not use any negative terms like "punishment," unless describing a misunderstood action. We use no abusive language or language that makes it sound like something is wrong with the participant. We always show respect for the participant. We do not refer to the children as "problem children." We should not refer to the participants or their behavior in any way that makes them sound like there is any thing "wrong" with the participant or that they are being punished. TIME OUT situations should not in an ordinary context be referred to as problems or in some other way that might be interpreted as a negative context. It should always be discussed in a more positive context regarding anything in relationshi to TIME OUT. For example what once might have been considered "problems" will be referred to as "areas in need of improvement" or "behavior that needs to be modified" with new information and techniques rather than problems in need of punishment TIME OUT'S more positive approach to what might be seen as out of control behavior, helps both the participant and the caregiver and/or teacher approach these inappropriate outburst of energy and/or inappropriate attitudes with a positive supportive team like approach more like a coach with a player in need of more information and supportive guidance as opposed to a more negative, aggressive cop/teacher approaching a budding gangster approach.

A more detailed explanation of the invention is provided in the following detailed descriptions and appended claims taken in conjunction with the accompanying drawings.

BRIEF DESCRIPTION OF THE DRAWINGS

FIG. 7 is a High School schematic flow diagram of the TIME OUT system and process for ninth through twelfth grade participants generally of 14-19 years of age in accordance with principles of the present invention. "HS" is the designation for ninth through twelfth grades.

FIG. 8 is an Adults schematic flow diagram of the TIME OUT system and process for adult participants generally of 19-79 years of age in accordance with principles of the present invention. "A" is the designation for adult participants.

FIG. 9 is a Seniors schematic flow diagram of the TIME OUT system and process for senior participants generally at least 80+ years of age in accordance with principles of the present invention. "S" is the designation for senior citizens.

DETAILED DESCRIPTION OF THE INVENTION

The following is a detailed description and explanation of the preferred embodiments of the invention and best modes for practicing the invention.

Figure 1:
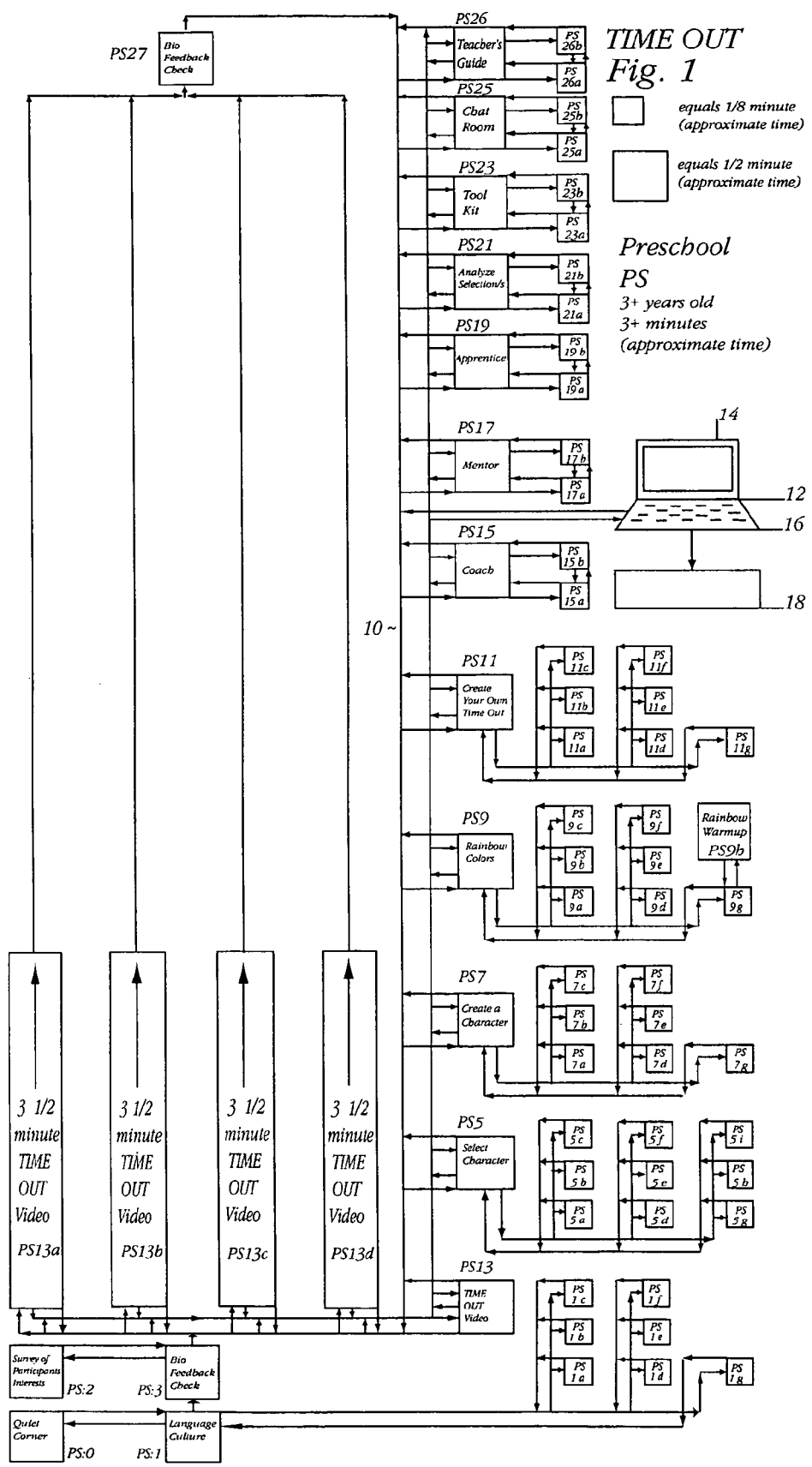
FIG. 1 is a Preschool schematic flow diagram of a TIME OUT system and process for preschool participants generally of 3-5 years of age in accordance with principles of the present invention. "PS" is the designation for preschool.
Figure 2:
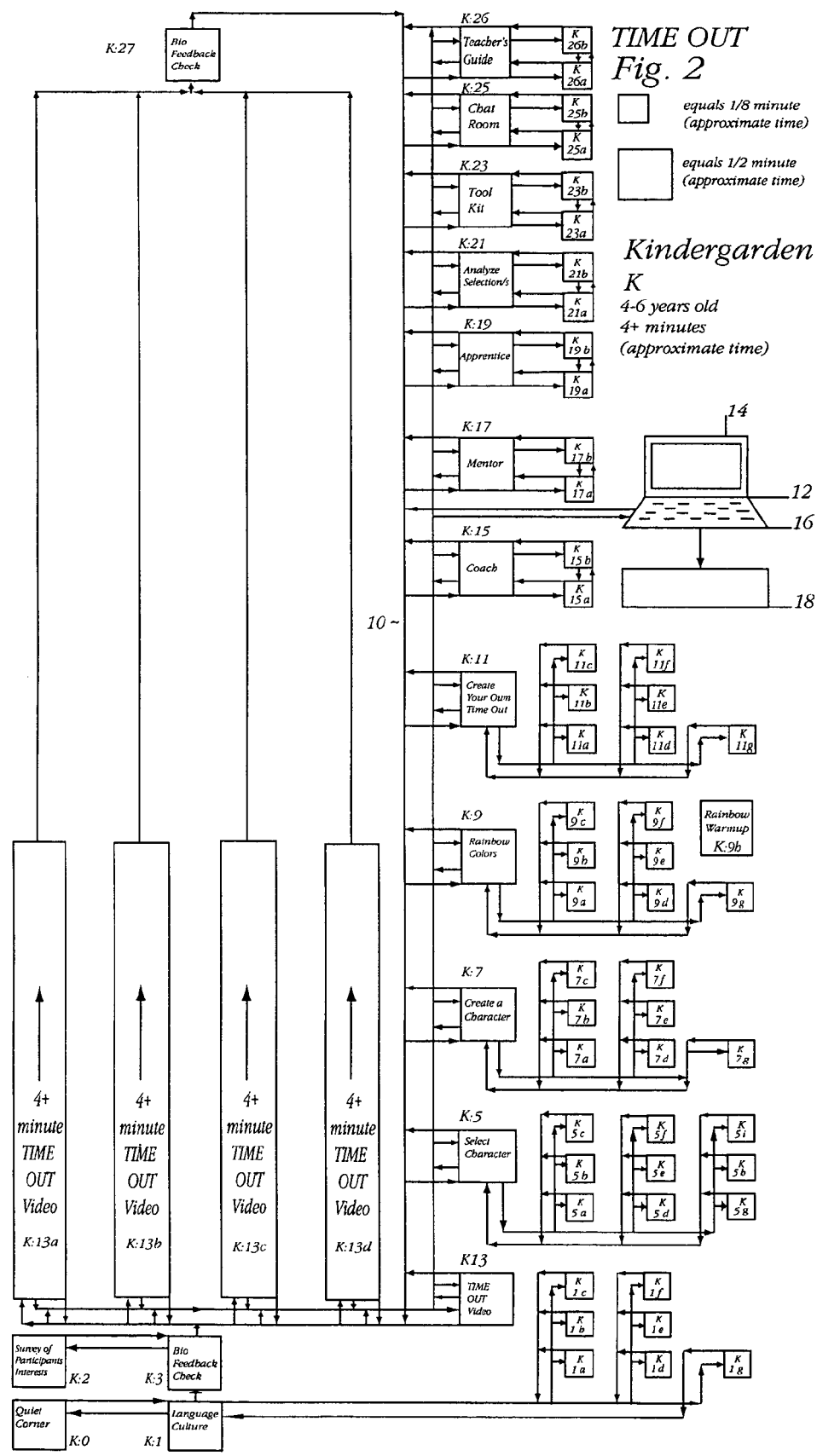
FIG. 2 is a Kindergarten schematic flow diagram of the TIME OUT system and process for kindergarten participants generally of 4-6 years of age in accordance with principles of the present invention. "K" is the designation for kindergarten.
Figure 3:
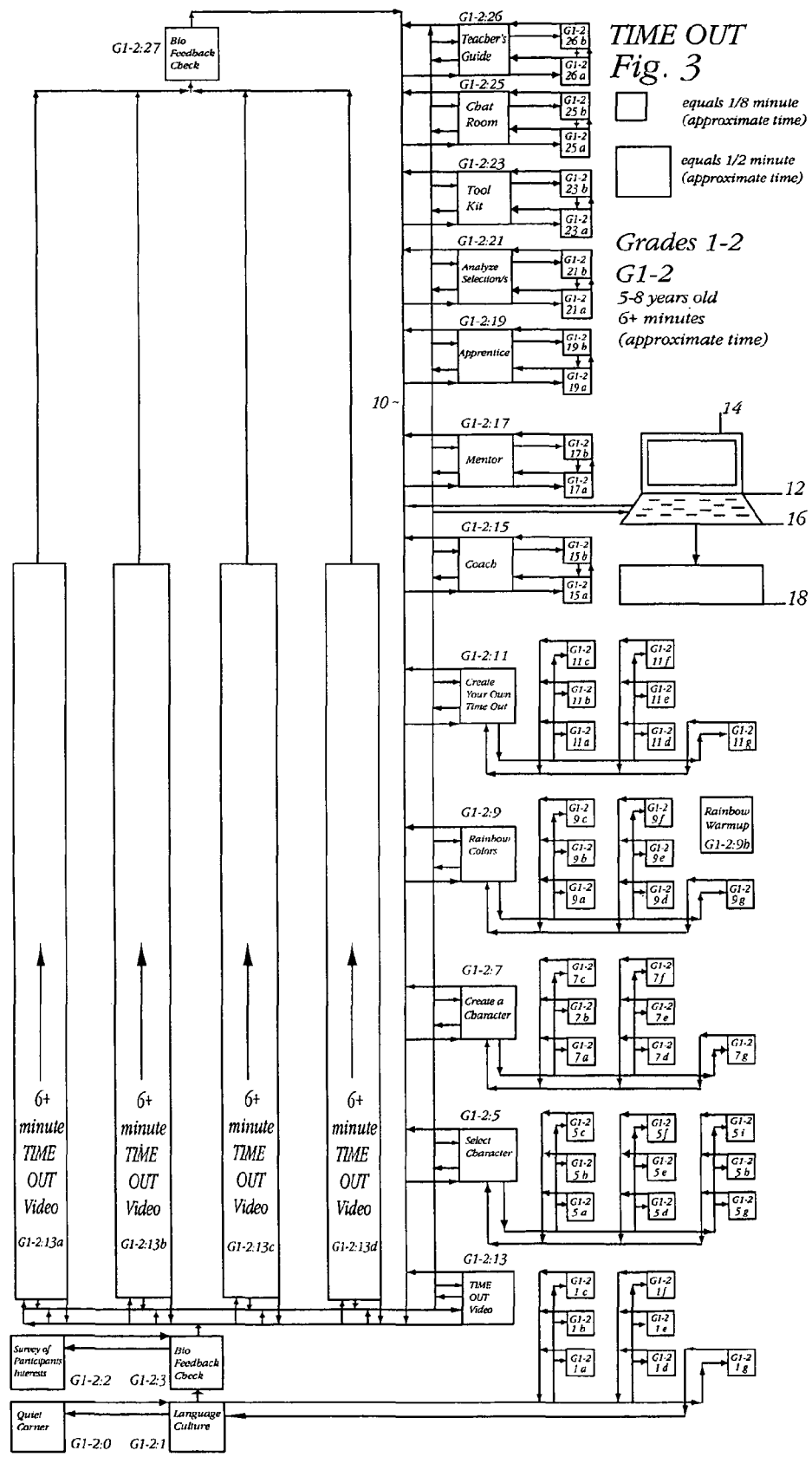
FIG. 3 is a Grades 1-2 schematic flow diagram of the TIME OUT system and process for first and second grade participants generally of 5-8 years of age in accordance with principles of the present invention. "G1-2" is the designation for first and second grades.
Figure 4:
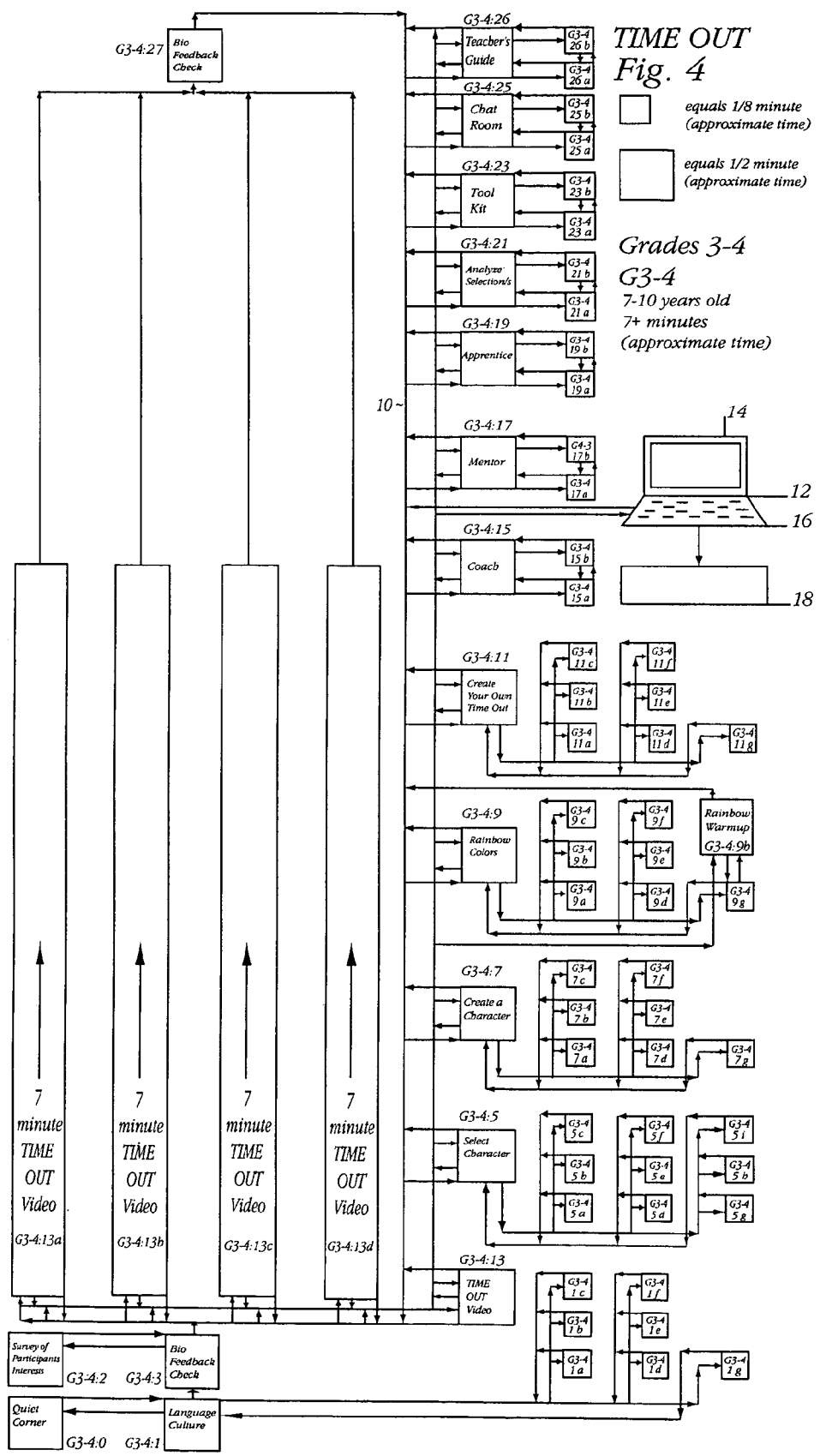
FIG. 4 is a Grades 3-4 schematic flow diagram of the TIME OUT system and process for third and fourth grade participants generally 7-10 years of age in accordance with principles of the present invention. "G3-4" is the designation for third and fourth grades.
Figure 5:
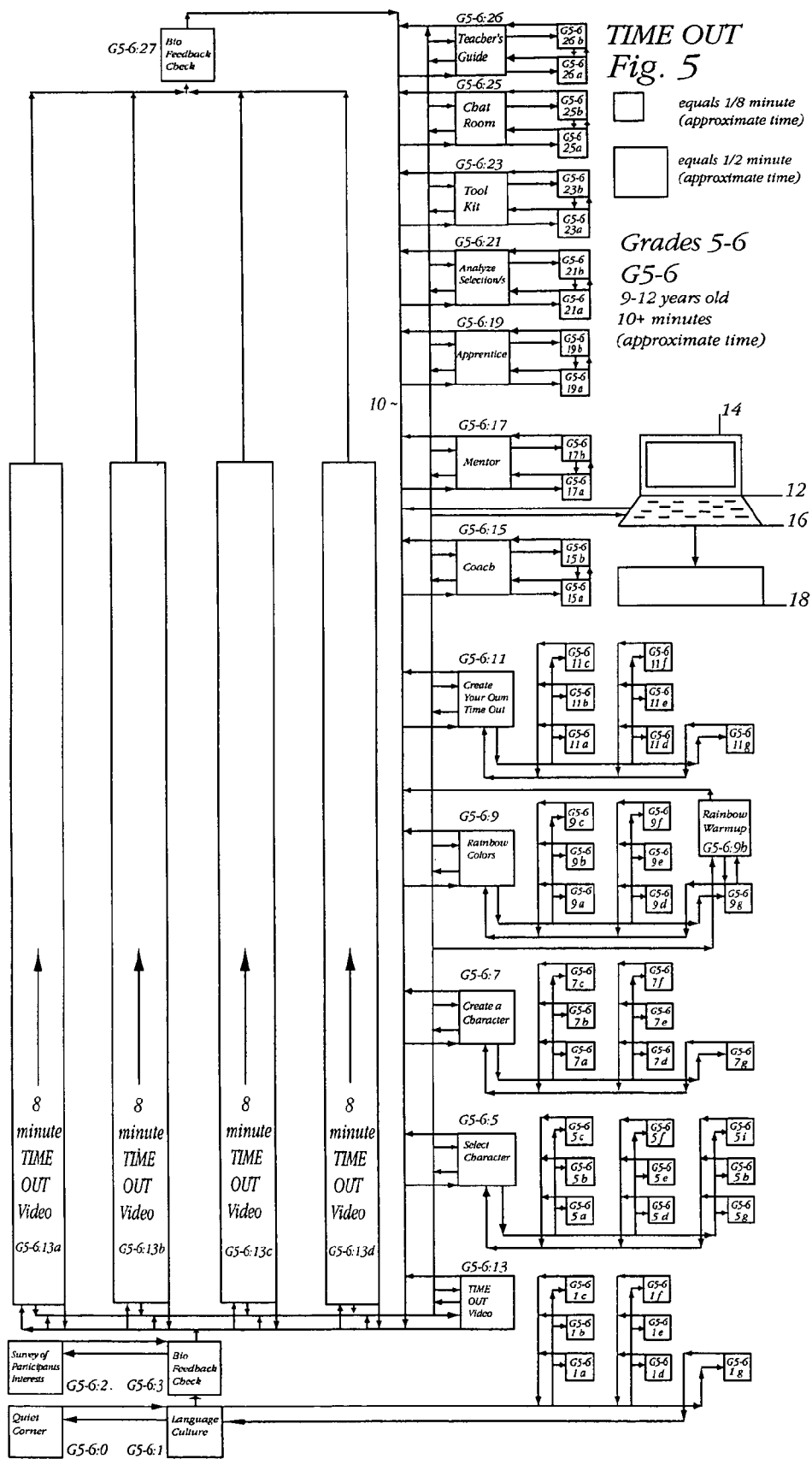
FIG. 5 is a Grades 5-6 schematic flow diagram of the TIME OUT system and process for fifth and sixth grade participants generally of 9-12 years of age in accordance with principles of the present invention. "G5-6" is the designation for fifth and sixth grades.
Figure 6:
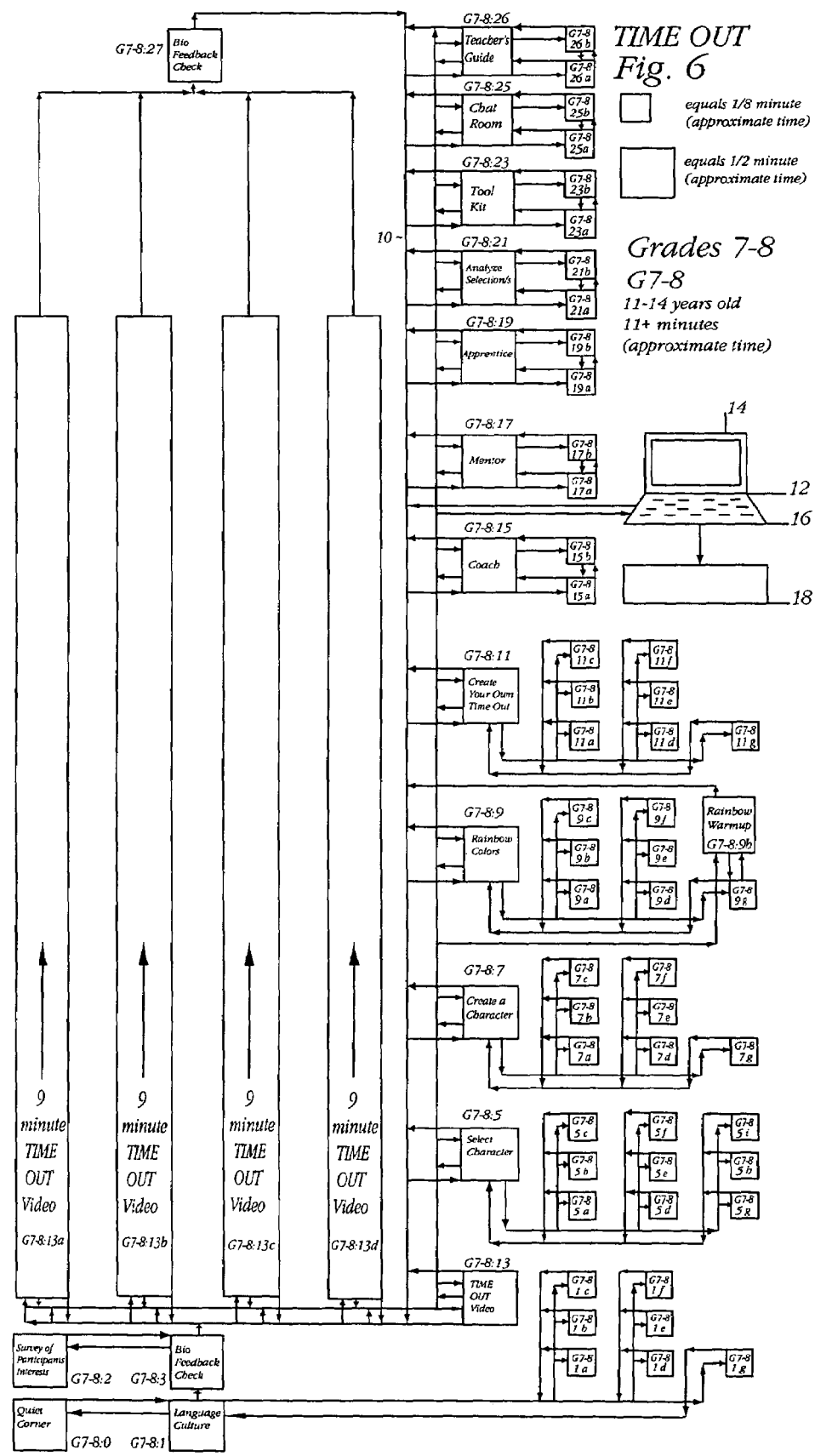
FIG. 6 is a Grades 7-8 schematic flow diagram of the TIME OUT system and process for seventh and eighth grade participants generally of 11-14 years of age in accordance with principles of the present invention. "G7-8" is the designation for seventh and eighth grades.

TIME OUT includes a computer software program system and method 10 whose operation is illustrated in FIGS. 1-9. The computer program can be downloaded directly by a computer disc (compact disc or CD), or purchased through the internet and can be accessed by a password or special code, or otherwise programmed into an electronic workstation comprising a central processing unit (CPU) 12, such as a wireless or hardwired microprocessor, laptop or desktop computer cell phone, iPod, Palm Pilot, Blackberry, mobile communications apparatus, or other electronic handheld devices, with a monitor or screen 14 and keys 16 and an optional printer 18, but is not limited to these units.

The behavioral modification system and process of TIME OUT can be experienced through both audio instructions the participant can hear through earphones, headphones, and/or the CPU built-in speakers, as well as written or pictorial instructions that can be displayed on the CPU monitor or screen.

TIME OUT is a computer generated behavior modification experience. The participant can be guided by audio instruction through either their earpiece, headset or the CPU speaker system and/or a filmed live action or animated video portion of their TIME OUT can appear on their CPU monitor or screen, through the TIME OUT that the TIME OUT process can select specifically for them, or one that they can personally create, to address what can be viewed as disorganized behavior that can be in need of modification, prior to deciding to, or being directed to, take their TIME OUT in the TIME OUT Program.

FIG. 1 through FIG. 9 each represent a different age grouping from Preschool to Senior Citizens, with the ability to divide the TIME OUT system and process into more age and grade groups.

The process can automatically take, navigate, or route the participant through TIME OUT electronic stations providing windows displayed on the CPU screen or monitor by a wireless or interconnected wired connection. This is preferably an audio/visual program. Some participants can be directed or routed to begin their TIME OUT at _0 Quiet Corner electronic station and window, especially if their behavior is out of control. The blank space preceding _0 can be either PS, K, G1-G2, G3-G4, G5-G6, G7-G8, HS, A, or S, which represents the appropriate age and/or grade level for the participant. A more experienced TIME OUT participant may also choose to spend quiet, reflective time in this safe supportive space before beginning their TIME OUT or sometimes even in place of a TIME OUT. Quiet Corner is also a place for quiet reflection or a place to quiet down from behavior that is out of control and might need modification, before beginning a TIME OUT. If a participant does not calm down, they may spend their entire TIME OUT here.

Ones' age group or grade in school determines which lettered or lettered and numbered delineation determines the level TIME OUT or FIG one experiences their TIME OUT in. For example Preschool participants might experience different music, if music is appropriate, than an Adult participant.

This can be all accomplished through wireless and/or interconnected wired connections.

All participants can then either move on to or begin their TIME OUT at _1 Language Culture electronic station and window via Language electronic stations and windows 1a-1g to select a language for their TIME OUT experience, such as, but not limited to, English, Spanish, French, German, Italian, Russian, Polish, Farsi, Ebonics, Mandarin Chinese, Wu Chinese, Japanese, Korean, Hindi, Hindustani, Malay-Indonesia, Bengali, etc. The selected language also may include native music and other qualities related to each particular culture.

One's familiar native language, with familiar sounds, music and a familiar sounding voice of narrator from one's own native culture can help serve as a bridge into the TIME OUT system and method for supporting and delivering the new information and guiding the participant in behavior modification skills they may need to successfully navigate their educational and life experience. This can give the participant support from the cultural experience they are coming from to integrate in a positive way into the new experience.

The _Language Culture (Language) is an electronic station and main window where all participants are asked to select the language that will guide them through their TIME OUT. There can be an audio track that guides them through this portion in each specific language as they click on each possible choice on the CPU with their CPU mouse or keyboard.

Video images can also complement each choice to help guide the participant. The language, audio and video choices may vary depending upon the particular geographical location, culture, age, and choices of the participant.

PS, K, G1-2, G3-4, G5-6, G7-8, HS, A, and S all should begin their TIME OUT at electronic station and window _1. The blank spaces preceding _1 and _1a through _1g will be either PS, K, G1-2, G3-4, G5-6, G7-8, HS, A, or S, depending upon the participant's age and/or grade level. The number of different age groups represented in TIME OUT can be increased or decreased, as desired.

This step and the participants entire personal process can be automatically saved in the participants own personal TIME OUT Tool Kit, which is located on FIGS. 1-9 at electronic station _23. The blank space preceding _23 can be either PS, K, G1-2, G3-4, G5-6, G7-8, HS, A, or S, which represents the appropriate age and/or grade level for the participant.

The first day of school, or before beginning the TIME OUT process for the first time each year, each participant can fill out questionnaires about themselves at electronic station _2 Survey of Participant's Interests. The blank space preceding _2 can be either PS, K, G1-2, G3-4, G5-6, G7-8, HS, A, or S, which represents the appropriate age and/or grade level for the participant. This can be accessed, used and/or referred to by: one's teacher, caregiver, parent, helper, coach, mentor, or the professional guiding the participant in an apprenticeship, or the actual TIME OUT participant.

The caregiver, teacher, helper, coach, mentor, or the professional guiding the participant in an apprenticeship, or the actual TIME OUT participant depending on the participant's age and experience with the TIME OUT system, can be prompted to enter, or say out loud, the participant's name, age, and sex, or an assigned code and/or password into the system, with the CPU keyboard and/or CPU mouse, and/or through a voice transmission device. They can then select the activity and/or activities, and/or behavior/s that warranted them being assigned a TIME OUT, from a selection of choices that are listed on their CPU screen or monitor. The teacher, caregiver, parent, helper, coach, mentor, and/or the professional guiding the participant in an apprenticeship, or the actual TIME OUT can be prompted by audio instructions through a headset, or through an earpiece can be provided with the TIME OUT program for privacy, or by the CPU speakers and/or written instructions on video selections or images that appear on the participant's CPU screen or monitor. This can be accomplished through wireless and/or interconnected wired connections.

All participants in FIGS. 1-9 can be routed or taken by wireless and/or interconnected wired connection to audio and/or video instructions to number _3 Bio Feedback Check electronic station that can provide a window where the participant can begin their actual TIME OUT process upon the application of a monitor or sensing device that can be placed upon a designated area of their body that can automatically, or electronically and readily detect the current level of the participant's stress by measuring signals from the participant's body. The TIME OUT system can record the results electronically and in a visual manner, that is easy to see and understand on the CPU screen or monitor. Audio and visual instructions can guide them throughout the entire process.

At the _3 Bio Feedback Check electronic station and window, each participant can be guided through both audio and video guidance to measure signals from their own bodies. The system can translate the signals into a form that people can detect, recognize, and record the participant's current measurement before they begin their TIME OUT.

When one is stressed the adrenalin in one's body can rush to the heart for protection and the body temperature of their extremities (hands and feet) can drop and can vary from cool to cold, depending upon the level of one's stress.

With this first step alone the participant can begin to learn how to recognize the symptoms of stress in his or her body.

An initial _3 Bio Feedback Check electronic station can register one's current level of stress, with a medically proven method, before they begin their TIME OUT. PS, K, G1-2, G3-4, G5-6, G7-8, HS, A, and S can all begin here. The blank space preceding _3 can be either; PS, K, G1-2, G3-4, G5-6, G7-8, HS, A, or S, depending upon the participant's age and/or grade level.

The TIME OUT program can record the result of the _3 Bio Feedback Check and save it in their _23 TIME OUT Tool Kit. The initial _3 Bio Feedback Check can also electronically display, report and/or explain the participant's personal results of their biofeedback process.

After the participant completes the Bio Feedback Check, the TIME OUT system can automatically select an appropriate TIME OUT, or the participant may be allowed to select and/or create a particular TIME OUT themself, depending upon the age and/or grade level of the participant, and their experience with the TIME OUT program.

Giving someone a "time out," can often unintentionally create an adversarial power struggle. The power struggle can create an energetic overload. This overload can create behavior that does not support positive self-esteem or a personal environment suitable for learning.

To help participants regain positive self-esteem, they can be given choices about; characters, colors, and other aspects of some of their TIME OUTS, including the possibility of selecting the type of TIME OUT they believe can work out best for them at this particular time. The best TIME OUT for the participant at this particular time can also be determined by their age and/or their particular inappropriate behavior that may have sent them to experience a TIME OUT.

In regaining a sense of "control" over their TIME OUT, the participant can be supported to regain a positive sense of self-esteem in a personal environment suitable for learning.

A participant's choices can also allow the variables they have chosen in this TIME OUT to be analyzed by the CPU at the _21 Analyze Selections electronic station and window which can be wireless and/or activated through interconnected wired connections. Here the older more advanced participants, groups G1-2 G3-4, G5-6, G7-8, HS, A, and S may decide or be directed to advance to: the _5 Select a Character electronic station.

The _5 Select a Character electronic station can provide an electronic window where a participant and/or caregiver can electronically select a character, such as an animated character, cartoon character, video character, television personality, musical personality, movie star, sports star, or other respected personality to guide them through the audio portion of their TIME OUT, or in some cases, the entire audio and/or video portion of their entire TIME OUT.

At the _7 Create a Character electronic station and window, the participant can be guided by audio and video instructions. The participant can create their own character from the following choices: _7a body and/or clothes, pants, or shorts, or skirt, shirt or blouse or dress, or coat, _7b head, face and/or neck, _7c hair and/or hat, _7d nose and/or mouth, _7e eyes, _7f legs and/or feet and/or shoes or boots, _7g arms and hands and/or gloves or mittens. These choices can help give the participant a sense of control and many can also be analyzed at _21 Analyze Selections electronic stations and windows.

In K1, G1-2 G3-4, G5-6, G7-8, HS, A, and S, the participant may be directed to or decide to advance to _9 Rainbow Colors electronic stations and windows, to color their character and/or TIME OUT. The _9 Rainbow Colors electronic stations can provide electronic windows where the participant can be guided by audio and/or video instructions to select the colors of their character and/or background for their TIME OUT from the seven colors of the Rainbow, i.e. the following Rainbow Colors: _9a Red, _9b Orange, _9c Yellow, _9d Green, _9e Blue, _9f Purple, and _9g White.

Each color can correspond to a particular part of ones body and can represent a particular energy center that can also be referred to as a point of behavioral balance.

Each color can also have its own corresponding sound vibration. One does not actually "hear" the sound that each color "sings" because the harmonics of color are approximately forty octaves higher than humans are able to hear.

Since one is unable to hear the actual sounds of color, this TIME OUT Program uses specific sounds to represent the rainbow colors.

Red, the color of the first or base point of behavioral balance can be programmed to resonate to the key/note of "C" on the musical scale, Orange, the color of the second point of behavioral balance can be programmed to resonate to the key/note of "D" and so on up the scale. To simplify it further, TIME OUT can use the familiar sounds of music, DØ, RE, ME, FA, SOL, LA and TI to represent the sounds of color on the musical scale:

Red=DØ=C
Orange=RE=D
Yellow=ME=E
Green=FA=F
Blue=SOL=G
Purple=LA=A
White=TI=B

Red can be the root or base point of behavioral balance. This point can be located at the base of the spine. Red can include one's genitals and can govern the spinal column and/or kidneys. Red can help one understand the physical dimension, energy, strength and vitality.

Orange can be the sacral point of behavioral balance and can be located three fingers below the naval and can govern the reproductive system. Orange can govern relationships, reproductive attitudes and/or creativity and can evoke joy and/or celebration.

Yellow can be the point of behavioral balance that can be located at the solar plexus, and can be located two fingers below the navel. It can govern the stomach, liver, gall bladder, spleen and/or some aspects of the nervous system. Yellow can clear and balance issues of personal power and emotional sensitivity and can evoke intellect, success, unity and inspiration.

Green can be the heart point of behavioral balance and can be located at the center of the chest. Green can govern the vagus nerve, circulatory system, blood and/or heart. It can influence the endocrine system and/or immune system and can evoke balance, love and/or growth.

Blue can be the behavioral balance center that can be located at the throat. It can govern the throat, thyroid, lungs, and vocal and/or bronchial apparatus. Blue can influence judgment, expression, communication, and/or evoke peace, and/or devotion and/or harmony.

Purple can be the behavioral balance center that can be located at the center of the forehead, a little above and between one's actual eyes. It is sometimes referred to as the "third eye." It can govern the ears, nose, left eye, nervous system and/or lower brain. It can attune one with our spiritual nature and can evoke intuition, wisdom and/or overview.

White can be the behavioral balance center for the "crown" area at the top of the head. It can govern the right eye and upper brain. When in balance, one may ultimately experience the feeling of spiritual integration. It can evoke sincerity, truth and/or purity.

The colors and/or corresponding sounds can be used together throughout the TIME OUT Program and the Rainbow Warm Up.

Younger participants' color selections can be bright vibrant colors, as vibrant colors can be more healing for younger participants. This includes: PS, K, and G1-2.

Older participants' color selections can be represented by pastel colors, as pastel colors can be more healing as one matures. This includes: G3-4, G5-6, G7-8, HS, A, and S, although some seniors can prefer bright vibrant colors.

This can all be accomplished through wireless or interconnected wired connections.

The blank space preceding 9a through 9g can be either; K, G1-2, G3-4, G5-6, G7-8, HS, A, or S, depending upon the participants age and/or grade level.

The _9h Rainbow Warm Up electronic station and window can be both video and audio. The Rainbow Warm Up is a short additional exercise that the participant may choose to experience before beginning their actual TIME OUT process in levels G5-6, G7-8, HS A, or S, FIGS. 5 through FIG. 9. Or a participant may be directed to select participation in a Rainbow Warm Up.

The colors and corresponding sounds defined above in _9 Rainbow Colors can be used together, or singularly, throughout the TIME OUT program and are also featured in _9h Rainbow Warm Up.

The participant can use the entire "Rainbow Warm Up" section as one exercise or can select a single color to help them concentrate on a specific issue or area of their body depending upon their preference or how they are directed to take their TIME OUT. Each color in this section can be accompanied by the specific information and/or sound and/or color work relating to each color.

G3-4, G5-6, G7-8, HS, A, and S participants may decide, or be electronically routed, to advance to _11 to Create Your Own Time Out, where they can create their own TIME OUT from the following selections: _11a Character, _11b Background, _11c Narrator, _11d Music, _11e Language/Culture, _11f Rainbow Colors, and _11g Other Items. The blank space preceding _11 can be either G3-4, G5-6, G7-8, HS, A, or S, depending upon the participants age and/or grade level, and/or their experience with the TIME OUT system and process.

Then the TIME OUT system and process can automatically route or take participants to number _5 select a Character electronic station and window. This can be accomplished through wireless and/or interconnected wired connections.

PS and K participants, can be guided by audio instructions to _5 Select a Character. Those participants who have not created a character or have not created their own TIME OUT at levels; G1-2, G3-4, G5-6, G7-8, HS, A, or S, can also select a character here if they did not already _7 Create a Character, or _11 Create Your Own Time Out.

At the _5 Select a Character electronic station and window, participants can be guided to select the person or character they want to lead them through their TIME OUT, such as at, but is not limited to, the following electronic stations and windows: _5a, _5b, _5c, _5d, _5e, _5f, _5g, _5h, and _5i. Each represents a different "character" and audio and/or video and selection appropriate to the participant's "grade" and/or age level, which can guide the participant through the particular audio and/or video portion of their TIME OUT. The participant can be guided by their selected characters voice and/or by voice and/or video image from a screen or monitor within the CPU main TIME OUT video screen or monitor. Each "Character" can represent a different language, age group, specific interest, and/or culture to experience ones TIME OUT in. The blank space preceding _5a through _5i can be either PS, K, G1-2, G3-4, G5-6, G7-8, HS, A, or S, which represents the appropriate age and/or grade level of each TIME OUT participant.

The visual portion can be the same or different on all of the different choices, with different selected characters' voices. A small screen within the screen of the actual character or person who is guiding them through the audio portion of the TIME OUT can also be shown on the CPU screen or monitor. Characters can preferably be related to age, culture, and grade level. There can be more or less than the nine selections in each category that is mentioned below. For example, an animated or live action cat can be the main video and the others mentioned below might be in the smaller screen or image within a CPU screen or even full CPU screen during the TIME OUT method.

Some examples of voices and/or images and/or video clips for specific grades and/or age groups can include, but are not limited to the following:

For PS, K, G1-2, G3-4, and G5-6 participants: 5a Dora the Explorer voice and/or video, 5b Dr. Seuss Character voice and/or video, 5c Maya and/or Miguel voice and/or video, 5d Shrek voice and/or video, 5e Captain Underpants voice and/or video, 5f Nemo voice and/or video, 5g Animated or live action Cat, voice and/or video.

For G7-8, G9-12 or HS participants: 5a animated 3D character voice and/or video selected, built, formed, or electronically constructed or designed on the CPU by the participant, 5b Sports Celebrity voice and/or video, e.g. Phil Jackson, 5c Hip Ho Business Celebrity voice and/or video, e.g. the godfather of hip-hop and businessman Russell Simmons, 5d Fashion Celebrity voice and/or video, e.g. owner of Baby Phat clothing Kimora Lee, 5e Dracula voice and/or video, 5f Animated Cat voice and/or video.

For A and S participants: 5a animated 3D character voice and video selected, built, formed, or electronically constructed or designed on the CPU by the participant, 5b Respected Celebrity and/or Music Star voice and video and/or Movie Star voice and/or video, 5c Television Star voice and/or video, 5d Animated Cat voice and/or video.

The _13 TIME OUT Video electronic station and windows _13a through _13d can each represent a different version of the complete video and audio portion of the actual TIME OUT that teaches each participant the TIME OUT that can be selected for them by the CPU software program, or can be selected by the participant, or can be created by the participant, depending upon his or her age, their particular behavior, and their experience with the TIME OUT Program.

PS, K, G1-2, G3-4, G5-6, G7-8, HS, A, and S all are preferably required to participate in the TIME OUT Video section of TIME OUT unless they have been directed to participate in only the Quiet Corner or Rainbow Warm Up instead of, or in addition to, their TIME OUT. The videos can be from 3½ to 14+ minutes, but can be of a shorter or longer duration depending on the participant's age, and/or the participant's speed, and/or needs and/or attention span.

Here they can begin the audio and video portion of the TIME OUT Exercise portion of this CPU generated behavior modification experience.

The participant can be guided by audio instruction through either their ear piece, their headset, or the CPU speaker system and/or the filmed live action and/or animated video portion of their TIME OUT that appears on their CPU monitor through the TIME OUT that the TIME OUT process can automatically select specifically for them, or one that they can personally create, or select, to address their disorganized behavior or other actions prior to deciding to, or being directed to, take the TIME OUT that they are currently participating in through this TIME OUT Program.

Each TIME OUT can use clinically proven healing methods that include, but are not limited to: color, sound, breath, movement, music, visualization, guided imagery, relaxation, reflection, art, art therapy, and biofeedback, and can engage one or all of the five senses to guide participants through times that call for a "time out."

Incorporating the healing methods found in TIME OUT can improve a students overall concentration in class, and their ability to learn.

TIME OUT can also incorporate the body into the healing process. It can incorporate directed body movement and making particular sounds, because both moving our bodies and sound are very much a part of our learning. Learning is not an isolated "brain" function. Every nerve and cell is a network that can contribute to our intelligence and our learning capability.

The results of the current brain studies are proving that incorporating our bodies into the learning process can produce excellent results.

Each of the five senses, smell, taste, touch, sight and sound, can be included in each and every TIME OUT because, one of the most effective ways to receive information, is through one's senses. Different individuals may respond to only one sense and not to two, three, four, or five senses. Including all five senses in each TIME OUT can allow all TIME OUT participants to find a sense that they naturally resonate to, to help all participant's have the opportunity to become engaged in each of their TIME OUTS.

TIME OUT'S electronic stations and windows can offer the participant tools to teach them how to recognize the physical and physiological signs that precede or accompany an inappropriate outburst of energy.

This can allow an individual a choice about what they want to do. Instead of being a victim of these outbursts, the individual can learn that they can have a choice whether they want to be driven by these emotions or whether they want to be in the driver's seat, i.e. take control of their behavior and manage their energy.

TIME OUT can give individuals simple learning tools that can be used over and over throughout their lives. This can help one navigate through highly emotional times and can help them improve the quality of their lives.

One can learn how to take their disorganized behavior that disrupts both them and the organized behavior of the rest of the class and/or group and reorganize it. This can teach them how to become a reorganized class and/or group participant instead of the disruption that they have often been.

The TIME OUT program and video can use healing stress reducing video(s) and audio directions and guidance for games and exercises that include, but are not limited to: bio-feedback, sound, music, guided imagery, breathing, movement, relaxation, visualization, color, and art and art therapy in a series of playful stress reducing exercises that can give the participants the tools to help them recognize their stress, can help them modify their behavior, and can help guide the participants through times that call for a "time out."

TIME OUTS can help modify the participant's behavior and can help transform it into beneficial creativity.

TIME OUTS can take these already existing periods of time or "time outs," as they are colloquially called, and can turn them from periods of "punishment" into "an ongoing learning process of experimentation, reflection and self-improvement."

Each TIME OUT electronic station and widow can guide the participant through exercises in experiential learning.

TIME OUT can help people approach challenging times more peacefully and with less fear.

TIME OUT educational products can be used for specific situations including schools, preschools, after school programs, children's hospitals, businesses, home and personal circumstances.

TIME OUT electronic stations and windows include exercises that can be specifically designed for each age group and each developmental transition that people experience in life.

In compatible delivery systems, the TIME OUT method and system can offer the participant free choice in selecting, coloring, and building the character they work with during each TIME OUT. This can give the participant feelings of self-control, self-worth, self-knowledge and can diffuse the power struggle that exists. It can also provide the participant and the facilitator further insight into the participant's current emotional makeup from their color and character selections.

Each participant's involvement, in either selecting their guiding character, or actually building it out of existing shapes and selecting the colors, depends upon their age, ability, their previous experience with TIME OUT, and the capacity of their delivery system.

The _13 TIME OUT Video electronic station can have the option of a screen within a screen to actually view the selected "Character" as one listens to the "Character" the participant has chosen from electronic stations and windows _5a through _5i, or they can choose to view or be directed to view the selected character in the full screen.

The older the participant the more time a TIME OUT can take. The time is roughly calculated to the participant's age, For example the TIME OUT for PS ages 3+ is roughly 3+ minutes long. The older the participant the longer the TIME OUT until the Senior Citizen (S) category where the time the TIME OUT takes, approximately 11+ minutes. This is actually less than the TIME OUT for Adults (A) which can take approximately 12+ minutes. In some circumstances, it may be desirable to have a longer or shorter TIME OUT period.

The period of time the TIME OUT can actually take is determined by the age and grade of the participant, and the participant's personal speed. These are approximate times. They are as follows: PS 3½ minutes, K 5 minutes, G1 7 minutes, G2-4 8 minutes, G5-6 10 minutes, G7-8 11 minutes, HS 12 minutes, A 14 minutes, or S 11 minutes. All times are estimated and may be subject to change depending on the participant's skills, needs, or attention span.

The blank spaces preceding _13 are PS, K, G1-2, G3-4, G5-6, G7-8, HS, A, or S depending upon the participant's age and/or grade level.

Upon completion of this part of the preceding TIME OUT exercise, the participant can automatically be guided or electronically routed by a wireless or wired connection to the second, final _27 Bio Feedback Check.

The blank spaces preceding _27 are either: PS, K, G1-2, G3-4, G5-6, G7-8, HS, A, or S depending upon the participant's age and/or grade level.

The participant can end their actual TIME OUT process here for the session upon the application of a sensor monitor that is placed on a designated area of their body that can automatically and/or electronically, efficiently, and/or readily measure the current level of their stress by measuring signals from the participant's own body and can record the results in an electronic and visual manner, that is easy to see and understand on their CPU monitor or screen. Audio and visual instructions can guide them throughout the entire process.

The completion _27 Bio Feedback Check electronic station can register one's current level of stress, with this medically proven method just as it did before they began their TIME OUT at _3 Bio Feedback Check electronic station.

The _27 Bio Feedback Check: PS, K, G1-2, G3-4, G5-6, G7-8, HS, A, and S can all end here. The blank space preceding _27 are either: PS, K, G1-2, G3-4, G5-6, G7-8, HS, A, or S, depending upon the participant's age and/or grade level.

The TIME OUT Program can electronically and automatically record the result of the _27 Bio Feedback Check and can save it in their _23 TIME OUT Tool Kit electronic station and window. The _27 Bio Feedback Check can also explain the participant's personal results of their biofeedback process.

The TIME OUT software program, system and process can compare records and displays, on the CPU screen or monitor. The system and process can compare the results of _3 Bio Feedback Check from when the participant first began their TIME OUT and _27 Bio Feedback Check where the participant completed this TIME OUT on their CPU. This can allow the participant to see how effective this specific TIME OUT was for them at this particular time. This can all be accomplished through wireless and/or interconnected wired connections.

This TIME OUT is completed at this time. Now, the participant has several options to pursue if they desire to do so, or if their teacher or caregiver considers any of them necessary for this particular participant at this time.

Participants can have access to an off-site COACH they can access at _15 Coach electronic stations and windows. Coaches can be accessed at email _15a electronic station and window or phone _15b electronic station and window. Participants at all levels may access a coach at any time during the TIME OUT process if they feel it is necessary. The blank spaces preceding _15, _15a, and _15b are either PS, K, G1-2, G3-4, G5-6, G7-8, HS, A, or S depending upon the participant's age and/or grade level.

In PS, K, and other times when necessary or desirable, caregivers can hel participants access a coach. In grades G1-2 and up, phone and e-mail access to trained TIME OUT coaches can be a very useful and important part of the TIME OUT system. Access to both e-mail and phone support can put teachers back in the classroom with the other students and can allow them to continue teaching instead of policing the class.

Students, who are old enough, are able to send and retrieve e-mail to a TIME OUT coach for support or even phone a TIME OUT coach themselves when a situation calls for it. Letting a student decide when to contact a TIME OUT coach supports behavior that creates positive self-esteem.

The trained coaches can be as varied and selected as necessary. This is also an area where entertainment and education can cross over with well-known celebrities that have taken control of their own lives, recording the TIME OUTS or even surprising students on rare occasions and responding as coaches. Each celebrity selected can learn or has already used similar techniques in their own personal life and often happens to be one of the most successful in each of their fields.

This can also send the message to children that these people, who are so successful and admired, use techniques, just like the ones they are learning, to organize their own behavior and personal lives. It is as if they are sharing their own personal "secret keys to success."

This can make TIME OUTS even more attractive to participants.

TIME OUTS can turn a time period that was considered punishment into a most effective, learning tool that participants can actually benefit from.

This can make the classroom a better learning environment for the teachers and all of the students in the class.

This is also an area where trained coaches can possibly coach students from the comfort of their computer or cell phone or other CPU.

The _15 Coach electronic station and window includes _15a electronic station and window and _15b electronic station and window. Here both audio and video instructions can help guide the participant contact a TIME OUT Coach to discuss their TIME OUT either at e-mail _15a electronic station or window or phone _15b electronic station and window. Ideally the same coach can continue with a student on an ongoing basis in most situations where it is desirable to do so.

The _15 Coach electronic station and window can be called upon to assist a participant through their entire TIME OUT, or to discuss the TIME OUT with the participant after completion, or to follow through after a challenging TIME OUT to check and see how the participant is doing. PS, K, G1-2, G3-4, G5-6, G7-8, HS, A, and S all have access to TIME OUT Coaches. This can be accomplished through wireless and/or interconnected wired connections.

The blank spaces preceding _15 are either PS, K, G1-2, G3-4, G5-6, G7-8, HS, A, or S depending upon the participant's age and/or grade level.

The _17 Mentor electronic station and window can be particularly useful for more advanced, experienced or adept participants, in levels G5-6, G7-8, HS, A, and S who have a special affinity to the TIME OUT process. The participant can be invited to work with a personal _17 Mentor whom they can access by e-mail at _17a electronic station and window and/or phone at _17b electronic station and window.

Here both audio and video instructions can guide the specially invited participant to contact a TIME OUT Mentor to discuss their TIME OUT either at e-mail _17a electronic station and window or phone _17b electronic station and window. These TIME OUT participants may help create a portion of a TIME OUT and even receive special awards.

G5-6, G7-8, HS, A, and S can all have wireless and/or wired access to TIME OUT Mentors if they are invited to do so. This section can be by invitation only to those who show a special affinity for this process.

The blank spaces preceding _17 are either: G5-6, G7-8, HS, A, or S depending upon the participant's age and/or grade level.

The _19 Apprentice electronic station and window includes _19a electronic station and window and _19b electronic station and window. Participants that have a special affinity to the actual development of the TIME OUT process, may be invited to work at an _19 Apprentice electronic station and window with a professional or professionals in the field whom they can access by email at _17a electronic station and window and/or phone at _17b electronic station and window to learn more about the actual development of TIME OUTS.

The more advanced participants can develop TIME OUTS and submit them in completed form, or even submit a part that can be combined with others efforts to make a completely new TIME OUT.

Music, storyboards, film images, and/or scripts that the participant(s) can develop or submit can be posted on the website and/or can be developed with the hel of professionals and/or experienced TIME OUT personnel, if necessary or desirable. This represents a mentor/apprentice program where an individual can be involved with adult professionals and/or experienced TIME OUT personnel in the actual conception, production, and team effort of a project from start to finish. It can also be an opportunity for professionals in the field to mentor at risk and other students from the comfort of their CPU.

These TIME OUTS can be included in a special section of the website, where the co-creators can monitor their use and success and engage in monitored chat room discussions about them.

Here both audio and video instructions can guide the participant to contact the professional in business with whom they apprentice to learn to build actual TIME OUT'S from scratch. The apprentice can contact their TIME OUT professional at e-mail _19a electronic station and/or window or phone _19b electronic station and window.

This section can be by invitation only to those who show a special affinity for this process and film development. These TIME OUT participants may help create an entire TIME OUT and may even receive special awards. Participants can use their work and contributions to this section as a portfolio to show to prospective schools and/or employers.

The blank spaces preceding _19 can be either: G5-6, G7-8, HS, A, or S depending upon the participant's age and or grade level.

This TIME OUT system and process can be accomplished by wireless and/or interconnected wires.

All TIME OUT participants at all age and grade levels can be eligible for special rewards and awards in the TIME OUT program.

At the _21 Analyze Selections electronic station and window, all participants FIGS. 1 through FIG. 9 and caregivers can have their current TIME OUT analyzed by the CPU in regards to their color selections and sometimes character and other choices.

An analysis of the participants character and color selections can also provide the participant, the coach, and/or the caregiver further insight into the participant's current emotional makeup and can give the participant, the coach, and/or the caregiver a deeper understanding of the participants current behavioral state.

The _21 Analyze Selection/s electronic station and window includes _21a and _21b electronic stations and windows. Audio and/or video instructions can guide the participant, coach and/or caregiver to request a TIME OUT CPU analysis of their current TIME OUT after they complete it. The _21a electronic station and window can allow the participant to select their just completed TIME OUT or another single TIME OUT and have it analyzed by the CPU. At _21b electronic station and window, one can choose to analyze a group of TIME OUTS or all of their TIME OUTS.

The blank spaces preceding _21 are either: PS, K, G1-2, G3-4, G5-6, G7-8, HS, A, or S depending upon the participant's age and/or grade level.

At the _23 Tool Kit, TIME OUTS are automatically saved during each TIME OUT in each participant's own personal TIME OUT Tool Kit electronic station and window. A participant can be guided, by both audio and video directions, to access the TIME OUT they just completed at _23a electronic station and window, and a historic library of all of the TIME OUTS they have ever completed at _23b electronic station and window. The participant is able to experience, retrieve and replay each of these TIME OUTS just as they created them, and use them again and again.

All of one's TIME OUTS for all age groups FIGS. 1 through 9, are saved in their _23 TIME OUT Tool Kit electronic station and window for further use and future reference at _23 Tool Kit electronic station and window. This process can be accomplished by wireless and/or interconnected wires. The blank space preceding _23 are either; PS, K, G1-2, G3-4, G5-6, G7-8, HS, A, or S depending upon the participants age and or grade level.

Every one who takes a TIME OUT is given a TIME OUT Tool Kit electronic station and window where all of one's own personal TIME OUTS are stored for future reference.

TIME OUT'S Tool Kit electronic stations and windows is where all of the participant's personal TIME OUTS are saved. They are able to access their TIME OUT Tool Kit and its contents at any time from any CPU and/or monitor.

Ideally a child starts using the TIME OUT program in preschool and takes their TIME OUT Tool Kit, filled with their "Tools for Life," to a grade school, which is enrolled in the TIME OUT program, on to middle school and high school which are also enrolled in the TIME OUT Program.

By the time this student leaves school and or graduates from high school the TIME OUT Program and their TIME OUT Tool Kit are companions for life. They can expand their guidance from TIME OUT products and services while at their jobs or in college and by now they would expect their employer to be enrolled in the program. TIME OUT is a friend for life.

The TIME OUT software program can provide a personalized behavioral healing system and method. Participants in the TIME OUT program have their own personal TIME OUT Tool Kit electronic station and window.

The _25 Chat Room electronic station and window is a supervised TIME OUT Chat Room _25, which can be accessed by wireless and/or interconnected wired connection for participants, caregivers and teachers.

All participants at all levels are able to access the supervised TIME OUT Chat Room electronic station and window. Many of the participant's questions can be answered here, _25a electronic station and window and _25b electronic station and window are designated for different age groups.

The blank spaces preceding _25 are either: PS, K, G1-2, G3-4, G5-6, G7-8, HS, A, or S depending upon the participant's age and/or grade level.

The _26 Teacher's Guide electronic station and window can be accessed by wireless and/or interconnected wired connection. Teachers can find helpful information and support here to help enhance the skill level of teachers and caregivers with helpful information and support materials that can be printed and used. Many of the teachers questions can be answered here, _26a electronic station and window and _26b electronic station and window are designated for teacher and caregiver support. The blank spaces preceding _26, _26a, and _26b are either: PS, K, G1-G2, G3-G4, G5-G6, G7-G8, HS, A, or S depending on the participant's age and/or grade level.

The ability to complete some of the particular steps in the TIME OUT system and process depends upon the capability of the delivery system that the participant is using to participate in the TIME OUT Program.

The TIME OUT web accessed program, and the software program can also be ideal for public schools, private schools, home schools, after school programs, hospitals, assisted living facilities, tutors, and home and family use.

Specific programs can be put together for other special needs including, but not limited to: businesses and their employees, working professionals, business leaders, e-learning technologies, and entire educational systems.

TIME OUT sessions can be animated and/or live action depending upon the specific TIME OUT, the specific delivery system, and/or situation.

Among the many advantages of the TIME OUT system and process can be:
1. Outstanding performance.
2. Superior educational techniques.
3. Superb academic results.
4. Greater learning skills.
5. Excellent behavior modification.
6. Better self-esteem and self-confidence.
7. Improved self-image.
8. Less disruption of classrooms and other students.
9. Enhanced treatment of various disorders.
10. Greater retention of knowledge.
11. Good rehabilitation assistance.
12. Easy to use.
13. Economical.
14. Attractive.
15. Efficient.
16. Effective.

Although embodiments of the invention have been shown and described, it is to be understood that various modifications, substitutions, and rearrangements of the software program, electronic stations, electronic windows, components, equipment, apparatus and devices, as well as other uses thereof, and other process or software steps and methods, can be made by those skilled in the art without departing from the novel spirit and scope of this invention.

What is claimed is:

1. An educational process, comprising the steps of:
providing a central processing unit (CPU) selected from the group consisting of a microprocessor, lap top computer, desktop computer, portable computer, cell phone, personal digital assistant, mobile communications apparatus, and electronic handheld device;
electronically selecting and inputting an age and/or educational grade of a user into the CPU;
electronically selecting a language at a language culture electronic station for view and/or listening by the user;
electronically creating a character from electronic body parts and electronic clothing at an electronic create a character station;
electronically providing an interactive time out session in electronic time out windows in the CPU based only upon input of the user without the assistance of a caretaker or another person for improving the behavior and ability of a user to learn and attain better academic results without assistance of a caretaker or another;
automatically recording data in the CPU resulting from a completed interactive time out session;
allowing the user to retrieve the recorded data from the CPU;
allowing the user to electronically communicate with other users about the time out session;
electronically transmitting completion biofeedback of the user into the CPU based upon the stress level of the user before commencing the interactive time out session;
electronically transmitting completion biofeedback of the user into the CPU based upon the stress lever of the user after completing the interactive time out;
comparing the completion biofeedback of the user to the initial biofeedback of the user in the CPU and recording the comparison in the CPU; and
allowing the user to electronically select at least one color f or the time out session.

2. An educational system, comprising:
a central processing unit (CPU) for use by a user alone without assistance or intervention of a caregiver or another person, said CPU including a screen or monitor, said CPU selected from the group consisting of a microprocessor, lap top computer, desktop computer, portable computer, cell phone, personal digital assistant, mobile communications apparatus, and electronic handheld device;

said user selected from the group consisting of a student, an adult and senior citizen;

said student being in a grade selected from the group consisting of -preschool, kindergarten, grade 1, grade 2, grade 3, grade 4, grade 5, grade 6, grade 7, grade 8, grade 9, grade 10, grade 11, and grade 12;

said student ranging from 4-19 years old;

said adult being more that 19 years old and less than 80 years old;

said senior citizen is at least 80 years old;

interactive electronic stations operable only by the user without any assistance or control of a caretaker or another person; said interactive electronic stations being operatively connected to the CPU, said interactive electronic stations including interactive electronic time out windows displayed on said screen or monitor, said interactive electronic stations being selected solely by the user alone without the assistance and intervention of a caregiver or anyone else; said interactive electronic stations comprising an electronic quiet corner station for providing a safe support space for quiet reflection;

an electronic language culture station for electronically selecting a language;

an electronic personal information station for electronically entering personal participant information:

an electronic language-selecting station for allowing the user to electronically selecting a language;

an electronic create a character station for allowing the user to electronically create a character with electronic body parts and electronic clothing;

a initial biofeedback check electronic station for sensing and recording the stress level of the user before proceeding to other interactive electronic stations;

an electronic character selecting station for electronically selecting a character;

an electronic character creating station for electronically creating a character from body parts and clothing;

an electronic color selecting station for electronically selecting at least one or more colors;

an electronic analyze selections station for electronically analyzing a completed time out session at one of the other interactive electronic stations;

a n electronic storage station for retrieving and automatically storing data from a completed time out session at another interactive electronic station;

an electronic user-communications station for allowing the user to electronically communicate with other users about the time out session and a completion biofeedback check electronic station for sensing and recording the stress level of the user after completing a time out session so that the stress level of the user before and after the time out session can be compared.

3. An educational system in accordance with claim 2 wherein said user is selected from the group consisting of: users with learning disabilities, emotional disorders, anxiety disorder, behavior disorder, attention deficit disorder, attention deficit hyperactivity disorder, cognitive impairments, retardation, traumatic brain injury, cross-categorical disabilities, autism spectrum (autistic behavior), Asperger's disorder, Down Syndrome, Tourette Syndrome, conduct disorder, obsessive-compulsive disorder, psychiatric disorder, bipolar disorder, sensor impairment, deaf, blind, speech disorders stuttering, lisping, auditory processing disorder, oppositional defiant disorder, post-traumatic stress disorder, depression, dysthymia, schizophrenia, premenstrual dysphoric disorder, and seasonal affective disorder.

4. An educational system in accordance with claim 2 wherein said interactive electronics stations further comprise:

an electronic exercise station for electronically providing an exercise pertaining to a specific issue or area of the body;

a create your own time out electronic station for electronically creating a time out session;

a video electronic station for electronically selecting and displaying a video; and an audio electronic station for electronically selecting and communicating audio.

5. An educational system in accordance with claim 2 wherein said interactive electronic stations further comprise:

a coach electronic station for electronically communicating with a coach; and/or a mentor electronic station for electronically communicating with a mentor; and/or an apprentice electronic station for permitting an apprentice to electronically communicate with a skilled professional to help enhance the skill level of a time out experience; and/or a teachers guide electronic station accessed only by teachers for providing helpful information, support material and/or work.

6. An educational process, comprising the steps of:

providing a central processing unit (CPU) selected from the group consisting of a microprocessor, lap top computer, desktop computer, portable computer, cell phone, personal digital assistant, mobile communications apparatus, and electronic handheld device;

electronically inputting and selecting an age and/or educational grade of a user in the CPU;

said user selected from the group consisting of a student, adult and a senior citizen;

said grade being selected from the group consisting of preschool, kindergarten, grade 1, grade 2, grade 3, grade 4, grade 5, grade 6, grade 7, grade 8, grade 9, grade 10, grade 11, and grade 12;

said student ranging from 4-19 years old;

said adult ranging from 20 years old to 79 years old;

said senior citizen is at least 80 years old;

inputting personal information into the CPU;

said user electronically selecting and interacting with interactive electronic stations in the CPU based only upon the input of the user without assistance and intervention of a caretaker or anyone else;

said user interactively participating in a time out session in electronic time out windows in the CPU;

electronically providing a safe support space for quiet reflection of the user at a quiet corner electronic station;

said user electronically selecting a language at a language culture electronic station for view and/or listening by the user;

said user electronically entering personal information at a personal information station;

electronically sensing and recording the stress level of the user at an initial biofeedback check electronic station before proceeding to other interactive electronic stations;

said user electronically creating a character from electronic body parts and electronic clothing at an electronic character select station;

said user electronically selecting at least one color for the time out session at a color selecting station;

said user electronically creating their own time out period at a create your own time out electronic station;

electronically analyzing a completed time out session at an analyze selections electronic station;

said user electronically retrieving and storing data from a completed time out session at an electronic storage station;

said user electronically communicating with other users about the time out session at a n electronic communications station;

electronically sensing and recording the stress level of the user at a completion biofeedback check electronic station after completing a time out session; and electronically comparing the stress level of the user before and after the time out session.

7. An educational process in accordance with claim 6 wherein said user is selected from the group consisting of: a user with learning disabilities, emotional disorders, anxiety disorder, behavior disorder, attention deficit disorder, attention deficit hyperactivity disorder, cognitive impairments, retardation, traumatic brain injury, cross-categorical disabilities, autism spectrum (autistic behavior), Asperger's disorder, Down Syndrome, Tourette Syndrome, conduct disorder, obsessive-compulsive disorder, psychiatric disorder, bipolar disorder, sensor impairment, deaf, blind, speech disorders stuttering, lisping, auditory processing disorder, oppositional defiant disorder, post-traumatic stress disorder, depression, dysthymia, schizophrenia, premenstrual dysphoric disorder, and seasonal affective disorder.

8. An educational process in accordance with claim 6 including electronically providing an exercise for the user pertaining to a specific issue or area of the body at an electronic exercise station.

9. An educational process in accordance with claim 6 including:

allowing the user to electronically select and display a video at a time out video electronic station;

electronically communicating with a coach at a coach electronic station; and/or electronically communicating with a mentor at a mentor electronic station; and/or electronically communicating with an apprentice at an apprentice electronic station to help enhance the skill level of a time out session for the apprentice; and/or electronically providing a teacher with information and/or support materials at a teacher's guide electronic station.

* * * * *